(12) United States Patent
Takahashi et al.

(10) Patent No.: US 6,363,807 B1
(45) Date of Patent: Apr. 2, 2002

(54) VARIABLE SPEED GEARING SYSTEM

(75) Inventors: Tsukasa Takahashi; Eiichiro Kawahara; Tetsuo Naraki, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/581,184

(22) PCT Filed: Oct. 6, 1999

(86) PCT No.: PCT/JP99/05501

§ 371 Date: Aug. 10, 2000

§ 102(e) Date: Aug. 10, 2000

(87) PCT Pub. No.: WO00/23720

PCT Pub. Date: Apr. 27, 2000

(30) Foreign Application Priority Data

Oct. 20, 1998 (JP) .......................................... 10-297997

(51) Int. Cl.⁷ ..................... F16D 43/08; F16D 21/00; F16H 3/44
(52) U.S. Cl. ................... 74/336 R; 475/262; 192/48.7; 192/105 C; 192/109 D
(58) Field of Search ................................ 475/293, 258, 475/262; 74/336 R; 192/48.7, 105 C, 109 D, 70.21, 526, 200; 464/162

(56) References Cited

U.S. PATENT DOCUMENTS 4,989,711 A * 2/1991 Schultz et al. ........... 192/105 F
5,033,598 A * 7/1991 Tipton ..................... 192/70.24
5,885,180 A * 3/1999 Antonov .................... 475/116

FOREIGN PATENT DOCUMENTS

JP         6-505082         6/1994
WO     WO-95/03597 A1 *   2/1995

* cited by examiner

Primary Examiner—Charles A Marmor
Assistant Examiner—Ankur Parekh
(74) Attorney, Agent, or Firm—Arent Fox Kintner Plotkin & Kahn, PLLC (57) ABSTRACT

A variable speed gearing system includes two clutch units 30, 50 placed side by side in the axial direction and provides a plurality of transmission gear ratios in response to the state of engagement of clutches 31, 51 of the two clutch units 30, 50. Axially movable members 26a, 48a of the two clutch units 30, 50 are arranged in such a manner as to confront each other. A damper mechanism 60 is constituted by the combination of a piston member 62 provided on one of the confronting axially movable members 26a, 48a and a cylinder member 61 provided on the other thereof.

3 Claims, 8 Drawing Sheets

VARIABLE SPEED GEARING SYSTEM

TECHNICAL FIELD

The present invention relates generally to a variable speed gearing system and, more particularly, to a mechanism for suppressing or reducing shocks (gear shift shocks) or vibrations/jars (gear shift judders) which may occur upon gear shifts.

BACKGROUND ART

Variable speed gearings designed to change the transmission gear ratios by engagement/disengagement of clutches have hitherto been known. Japanese Patent Laid-open Pub. No. Hei 6-505082 discloses by way of example a variable speed gearing of the type in which the clutches are engaged or disengaged by thrust forces applied to centrifugal clutches and planetary gears.

In the case of such clutches, the clutch engagement and disengagement are mechanically carried out, making it difficult to regulate and control the motions of the clutches, which often resulted in occurrence of gear shift shocks or judders upon gear shifting.

In the event of variable speed gearings which effect the gear shifts by the hydraulic drive of the clutches, a smooth clutch engagement/disengagement can be achieved by finely controlling the hydraulic pressure, although hydraulic pressure control means are necessitated resulting in a complicated structure.

DISCLOSURE OF INVENTION

It is an object of the present invention to provide a variable speed gearing system having a simple structure to reduce any shocks or judders which may be induced by gear shifts.

According to an aspect of the present invention, in order to attain the above object, there is provided a variable speed gearing system including two clutch units placed side by side in the axial direction, the variable speed gearing system providing a plurality of transmission gear ratios in response to the state of engagement of clutches of the two clutch units, the two clutch units being provided with axially movable members confronting each other; the variable speed gearing system comprising a piston member provided on one of the axially movable members confronting each other; and a cylinder member provided on the other of the axially movable members confronting each other, the piston member and the cylinder member constituting a damper mechanism in combination with each other.

Since the damper mechanism provides a resistance against the axial movements of the movable members upon the gear shifts depending on the rate of movements, it is possible to suppress any abrupt movement to ensure a smooth engagement and disengagement, to thereby reduce any possible gear shift shocks or gear shift judders.

Furthermore, the damper mechanism is constituted by the combination of the piston member and the cylinder member with utilization of the space defined between the two axially movable members confronting each other, whereby it is possible for the variable speed gearing system to have a simple configuration and reduced dimensions without any need to provide each clutch with a dedicated damper mechanism and without any need for a dedicated space therefor.

The variable speed gearing system may further comprise an oil chamber defined by the piston member and the cylinder member in cooperation, the oil chamber having an expanded or contracted volume; and communication passages extending from oil passages formed within shafts for axially movably supporting the movable members of the clutch units, into the oil chamber.

Thus, the oil chamber can be at all times fed with oil from the oil passage within the shaft through the communication passages, and the oil damper mechanism is implemented by the orifice effect of the communication passages allowing the oil to flow in and out due to the expansion and contraction of the oil chamber, whereby it is possible to achieve a smooth clutch engagement/disengagement to reduce the gear shift shocks or the gear shift judders.

The variable speed gearing system may further comprise flow control means disposed in the communication passages for imparting different passage areas to the communication passages between expansion and contraction of the oil chamber.

The relationships between the gear shift patterns and the magnitudes of the gear shift shocks will differ depending on the circumstances of use of the variable speed gearing system.

Thus, the flow control means provide a control so as to ensure that the passage areas of the communication passages become smaller upon the expansion if the gear shift patterns expected to present greater gear shift shocks occur upon the expansion of the oil chamber but that the passage areas become smaller upon the contraction if the gear shift patterns expected to present greater gear shift shocks occur upon the contraction of the oil chamber, whereby their resistances are increased so that the gear shift shocks can effectively be suppressed.

BEST MODE FOR CARRYING OUT THE INVENTION

Figure 1:
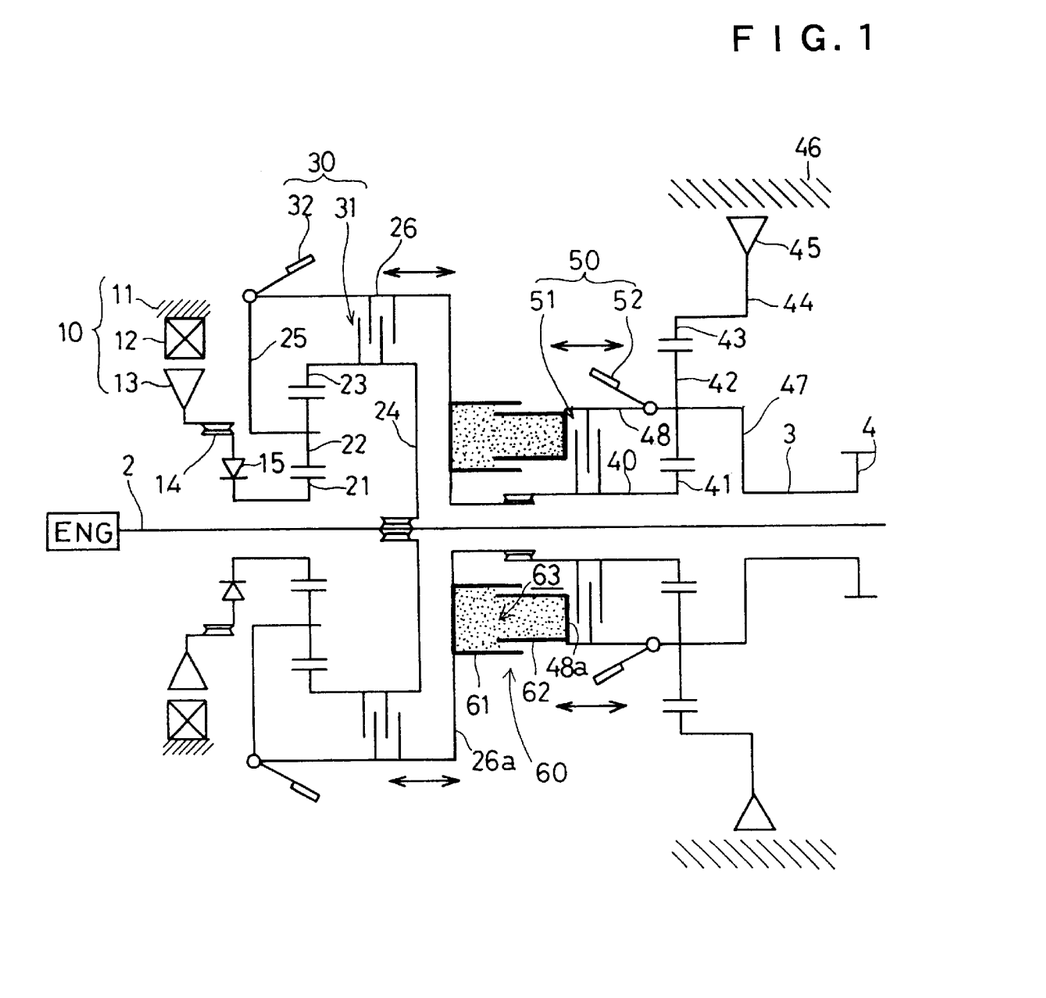
FIG. 1 is a schematic diagram of the configuration of a variable speed gearing system in accordance with an embodiment of the present invention.

The present invention will now be described with reference to FIGS. 1 to 5 which illustrate a preferred embodiment thereof. FIG. 1 depicts a schematic configuration of a variable speed gearing system 1 in accordance with the embodiment.

The variable speed gearing system 1 is capable of varying the speed in four steps from the first speed to the fourth speed in addition to neutral and provides a combination of front two steps and rear two steps allowing four-step gear shifts.

A front centrifugal clutch 30 shifts the front two steps and a rear centrifugal clutch 50 shifts the rear two steps. An electromagnetic brake 10 is provided for neutral.

A gear shift mechanism comprises a base shaft in the form of an input shaft 2 which directly receives a rotational driving force from the engine. The electromagnetic brake 10 comprises a fixed annular outer member 11, an exciting coil 12 arranged on the inner periphery of the outer member 11, and an inner member 13 rotatably supported on the inside of the coil 12. The inner member 13 is coupled by means of splines for example to a cylindrical rotary member 14 which is rotatably supported on the input shaft 2.

At one end of the cylindrical rotary member 14 coupled to the inner member 13 in this manner, a sun gear 21 is provided via a one way clutch 15 so as to rotate jointly, the sun gear 21 constituting a front two-step planetary gear mechanism.

In addition to the sun gear 21, the front planetary gear mechanism includes a planetary gear 22 which mates with the sun gear 21 and revolves around the sun gear 21 with rotations around its own rotational axis, and a ring gear 23 meshed externally with the planetary gear 22.

The ring gear 23 is coupled via a ring member 24 to the input shaft 2, with the planetary gear 22 being coupled via a carrier 25 to the rear step.

The carrier 25 itself rotates carrying the planetary gear 22 but is prohibited from its axial movement, although it is provided with an outer tubular portion in the form of a clutch guide 26 which is spline fitted around the carrier 25 in such a manner as to be slidable in the axial direction.

The sun gear 21, the planetary gear 22 and the ring gear 23 are helical gears each having teeth twisted oblique to the gear axis. When a high torque is applied from the input shaft 2 to the ring gear 23, the latter is subjected to an axially urging force, which in turn acts in a direction allowing the clutch guide 26 to move together via a thrust bearing 68 (see FIG. 2) to thereby disengage a multiple disc clutch 31.

The centrifugal clutch 30 is interposed between the clutch guide 26 and the ring member 24. The centrifugal clutch 30 is provided in the form of the multiple disk clutch 31 which includes a plurality of discs extending perpendicular to its axis in the portion where the clutch guide 26 and the ring member 24 form an outer tube and an inner tube, respectively, with the plurality of discs alternating with one another so as to permit an appropriate axial sliding movement. A centrifugal weight 32 serves to cause an axial relative movement of the clutch guide 26 relative to the ring member 24, to thereby effect the engagement and disengagement of the multiple disc clutch 31.

Rotation of the carrier 25 gives rise to a movement of the centrifugal weight 32 in the centrifugal direction, this movement being accompanied by a sliding movement of the clutch guide 26 in the axial direction (leftward in FIG. 1), whereupon once a predetermined number of times is exceeded, the clutch guide 26 relatively moves relative to the ring member 24, allowing the engagement of the multiple disc clutch 31.

On the other hand, the rear two-step gear shifts are also achieved by a planetary gear mechanism and a centrifugal clutch 50. A sun gear 41 is spline coupled to a cylindrical rotary member 40 in such a manner as to be rotatable jointly, with the cylindrical rotary member 40 being spline fitted to the clutch guide 26 of the carrier 25.

In addition to the sun gear 41, the rear planetary gear mechanism includes a planetary gear 42 which mates with the sun gear 41 and revolves around the sun gear 41 with rotations around its own rotational axis, and a ring gear 43 meshed externally with the planetary gear 42.

A ring member 44 provided with the ring gear 43 is engaged unidirectionally with a fixing portion 46 by way of a one way clutch 45.

A carrier 47 for rotatably supporting the planetary gear 42 is spline coupled to an output shaft 3 which is provided with an output gear 4.

The carrier 47 is provided with an outer tubular portion in the form of a clutch guide 48 which is spline fitted around the carrier 47 in such a manner as to be slidable in the axial direction.

The sun gear 41, the planetary gear 42 and the ring gear 43 constituting the planetary gear mechanism are helical gears each having teeth twisted oblique to the gear axis. When a high torque is exerted on the sun gear 41 coupled to the cylindrical rotary member 40 which is spline fitted to the front output shaft (clutch guide 26), the sun gear 41 is subjected to an axially urging force, which in turn acts in a direction allowing the clutch guide 48 to move together to thereby disengage a multiple disc clutch 51.

The centrifugal clutch 50 is interposed between the clutch guide 48 and cylindrical rotary member 40.

The centrifugal clutch 50 Is provided in the form of the multiple disk clutch 51 which includes a plurality of discs extending perpendicular to its axis In the portion where the clutch guide 48 and the cylindrical rotary member 40 form an outer tube and an inner tube, respectively, with the plurality of discs alternating with one another so as to permit an appropriate axial sliding movement. A centrifugal weight 52 serves to cause an axial relative movement of the clutch guide 48 relative to the cylindrical rotary member 40, to thereby effect the engagement and disengagement of the multiple disc clutch 51.

Rotation of the carrier 47 gives rise to a movement of the centrifugal weight 52 in the centrifugal direction, this movement being accompanied by a sliding movement of the clutch guide 48 In the axial direction (rightward In FIG. 1), whereupon once a predetermined number of times is exceeded, the clutch guide 48 relatively moves relative to the cylindrical rotary member 40, allowing the engagement of the multiple disc clutch 51.

Vertical annular walls 26a and 48a confront each other with a space defined therebetween for accommodating an oil damper 60, the vertical annular wall 26a on one hand being perpendicular to the axis of the clutch guide 26 acting as an axially movable member for the front centrifugal clutch 30, and the vertical annular wall 48a on the other being perpendicular to the axis of the clutch guide 48 acting as an axially movable member for the rear centrifugal clutch 50.

From the vertical annular wall 26a there extends an annular cylinder 61 having a U-shaped section and an opening directed toward the vertical annular wall 48a on the other. From the vertical annular wall 48a there extends an annular piston 62 similarly having a U-shaped section and an opening directed toward the vertical annular wall 26a on one hand. The piston 62 fits into the interior of the cylinder 61 in a freely slidable and relatively rotatable manner so as to provide the oil damper 60 having an oil chamber 63 formed therewith in.

Description will then be made of the oil damper 60 and its peripheral structure with reference to FIGS. 2 to 5 which illustrate the same in a specific manner.

Figure 2:
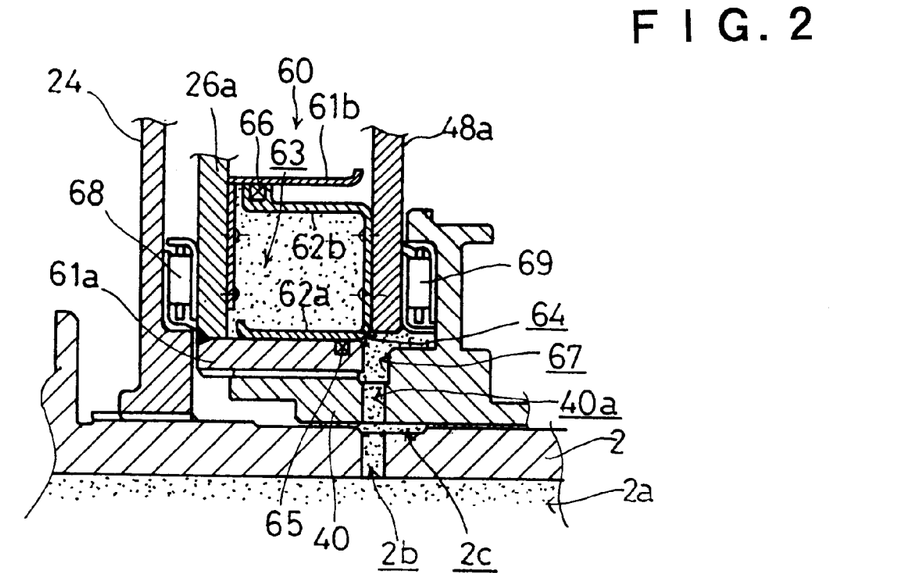
FIG. 2 is a sectional view showing a specific structure of an oil damper in the first-speed state of the variable speed gearing system.

The cylinder 61 associated with the front clutch guide 26 comprises an inner tubular member 61a fitted to the inner peripheral edge of the vertical annular wall 26a, and an outer tubular member 61b fixed to the annular wall 26a around the member 61a, the inner and outer tubular members forming a U-shaped section in cooperation. The piston 62 associated with the rear clutch guide 48 comprises an inner tubular portion 62a and an outer tubular portion 62b which are in advance assembled into an annular form with a U-shaped section, the assembly being fixedly secured to the vertical annular wall 48a.

The inner tubular portion 62a and the outer tubular portion 62b of the piston 62 are in sliding contact internally with the inner tubular member 61a and the outer tubular member 61b of the cylinder 61, respectively, the sliding contact portions being provided with seal members 65 and 66.

A communication hole 64 is formed in the inside corner of the piston 62.

The cylindrical rotary member 40 is slidably inserted between the input shaft 2 and the inner tubular member 61a of the cylinder 61, the cylindrical rotary member 40 being spline fitted to the inner tubular member 61a.

The cylindrical rotary member 40 is formed with a communication passage 40a extending from its interior up to its exterior. The communication passage 40a communicates with a space defined among the cylindrical rotary member 40, the vertical annular wall 48a, the inner tubular member 61a and the piston 62, and further with the communication hole 64.

The input shaft 2 includes therein an oil supply passage 2a extending along its central axis, into which oil is pumped by means of an oil pump disposed at its end, the oil supply passage 2a serving to supply oil to a plurality of desired parts of the variable speed gearing system 1. The input shaft 2 further includes a branch passage 2b extending toward the communication passage 40a of the cylindrical tubular member 40, and a circumferentially extending groove 2c formed, with a predetermined width, around the outlet portion of the branch passage 2b so as to allow a communication with the communication passage 40a at all times.

Oil within the oil supply passage 2a of the input shaft 2 is supplied through the branch passage 2b, the groove 2c, the communication passage 40a, the space 67 and the communication hole 64 into the oil chamber 63 so that the oil chamber 63 is constantly filled with the oil.

The slide bearing 68 is interposed between the vertical annular wall 26a and the ring member 24 in order to ensure smooth relative rotations between the two while freely varying the axial distance therebetween within a predetermined range.

A similar slide bearing 69 intervenes between the vertical annular wall 48a and the cylindrical rotary member 40.

The inventive variable speed gearing system 1 is a four-step speed variator equipped with the oil damper 60 and using the centrifugal clutches 30 and 50 as set forth hereinabove.

During the neutral, the electromagnetic brake 10 is in its released condition and the centrifugal clutches 30 and 50 are also in their respective disengaged conditions.

In this case, rotations of the engine are transmitted to the ring gear 23, but are not transmitted to the clutch guide 26 and thence to the output shaft 3 since the sun gear 21 is free with the centrifugal clutch 30 being released.

When the centrifugal clutches 30 and 50 are in their let-out conditions with a low engine speed, engagement of the electromagnetic brake 10 results in the first speed state.

More specifically, with the sun gear 21 fixed, rotations of the ring gear 23 cause the planetary gear 22 to revolve around the sun gear 21, allowing the carrier 25 to rotate. Rotations of the carrier 25 (clutch guide 26) give rise to rotations of the sun gear 41, which in turn causes the output shaft 3 to rotate at the first speed under the ring gear 43 whose rotations are blocked by the one way clutch 45.

During this first speed, the oil chamber 63 of the oil damper 60 is put in its most compressed state as shown in FIG. 2.

Excepting the neutral, the electromagnetic brake 10 is in its engaged condition to fix the sun gear 21.

When the front centrifugal clutch 30 is activated in the first speed state, the clutch guide 26 initially moves leftward in FIG. 1 together with the ring member 24, allowing the oil chamber 63 of the oil damper 60 to expand. Once the ring member 24 is halted by the stopper, the resultant relative approach of the clutch guide 26 allows the engagement of the multiple disc clutch 31, whereupon rotations of the input shaft 2 are transmitted via the ring member 24 intactly to the clutch guide 26, achieving the second speed state.

Figure 3:
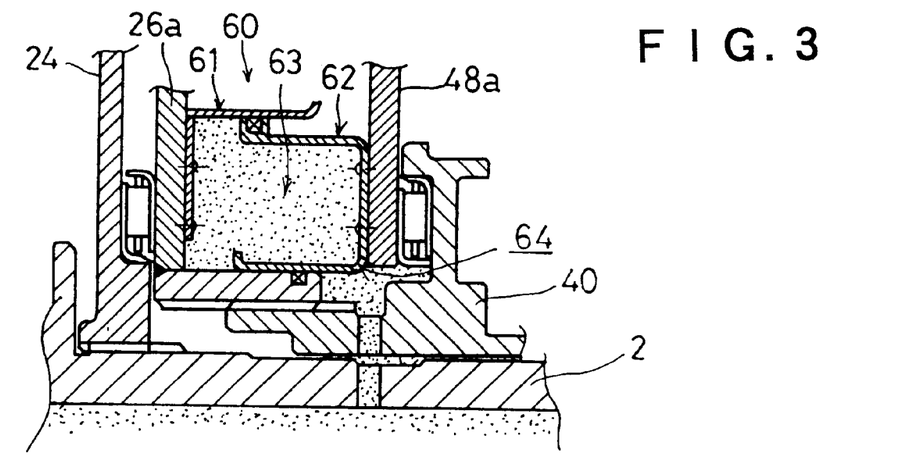
FIG. 3 is a sectional view showing a specific structure of the oil damper in the second-speed state of the variable speed gearing system.
Figure 4:
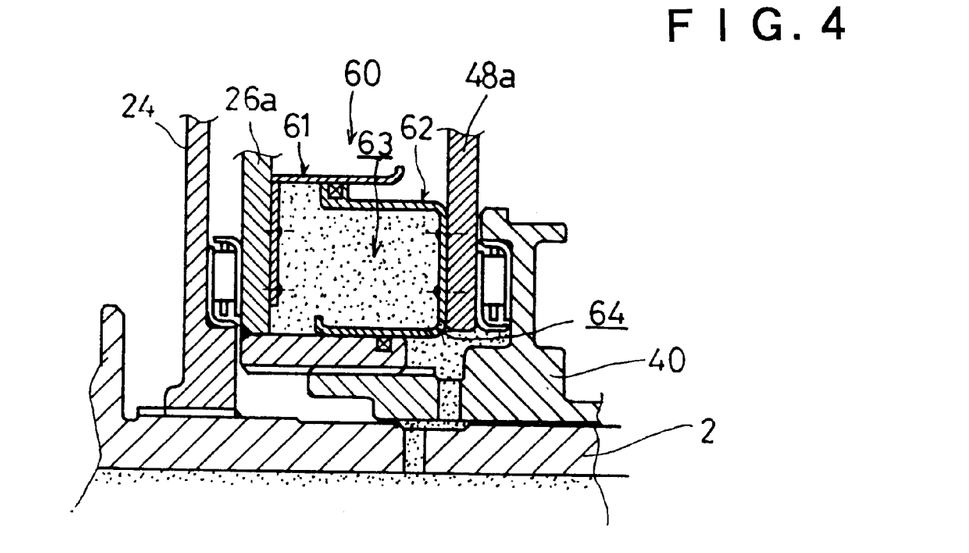
FIG. 4 is a sectional view showing a specific structure of the oil damper in the third-speed state of the variable speed gearing system.

In the second speed state, the oil chamber 63 of the oil damper 60 is allowed to have a volume of the extent shown in FIG. 3.

Then, when the increased vehicle speed makes the rear centrifugal clutch 50 active, the clutch guide 48 moves rightward in FIG. 1 to allow the engagement of the multiple disc clutch 51. In consequence, rotations of the clutch guide 26 in direct connection with the engine are decreased with a reduction of the engine speed, whereupon the front centrifugal clutch 30 is let out, achieving the shift-up to the third speed state.

When the ring gear 23 is rotated with the centrifugal clutch 30 released, the planetary gear 22 revolves jointly with rotations of the clutch guide 26, with the result that due to the engagement of the rear centrifugal clutch 50, the rotations of the clutch guide 26 are output as rotations of the output shaft 3.

The instant that the oil chamber 63 of the oil damper 60 is slightly expanded as a result of the rightward movement of the clutch guide 48, engagement of the rear centrifugal clutch 50 and release of the front centrifugal clutch 30 take place, whereupon the oil chamber 63 is displaced toward the right in its entirety without substantially changing its volume.

Then a further increased vehicle speed gives rise to an increase in the number of rotations of the front clutch guide 26 which rotates together with the output shaft 3, rendering the front centrifugal clutch 30 active, so that the clutch guide 26 is moved toward the left to expand the volume of the oil chamber 63. When a predetermine number of rotations is exceeded, the multiple disc clutch 31 is let in, achieving the shift-up to the fourth speed state.

The engagements of both the front and rear centrifugal clutches 30 and 50 allows rotations of the input shaft 2 to be output intactly as rotations of the output shaft 3.

Figure 5:
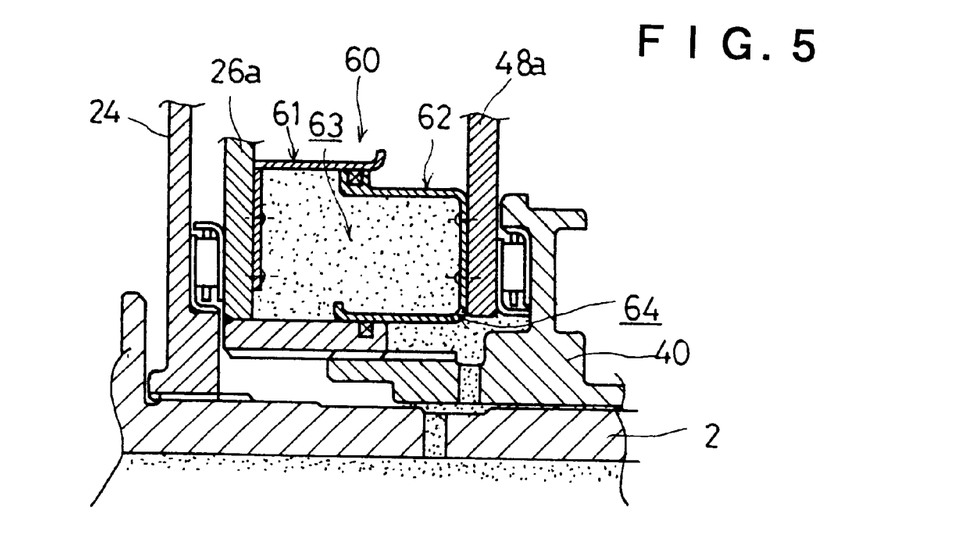
FIG. 5 is a sectional view showing a specific structure of the oil damper in the third-speed state of the variable speed gearing system.

In the fourth speed state, the oil chamber 63 of the oil damper 60 is expanded to the maximum as shown in FIG. 5.

Upon the kickdown, the helical gears of the front ring gear 23 and the rear sun gear 41 generate thrust forces which act in the directions releasing the centrifugal clutches 30 and 50, respectively, to reduce the transmission gear ratio.

In particular, upon the kickdown from the fourth speed to the first speed, the oil chamber 63 of the oil damper 60 varies greatly from its most expanded spate to its most contracted state.

In the event that the accelerator is released after a rapid acceleration, the thrust forces of the helical gears act in the direction allowing engagements of the clutches 30 and 50, opposite to the above directions, due to a torque arising from the wheel rotations, i.e., from the vehicle speed. Simultaneously the clutches 30 and 50 are more securely engaged due to the centrifugal forces, achieving the gear shift. In particular, upon the shift-up from the first speed to the fourth speed, the oil chamber 63 of the oil damper 60 varies to a large extent from its most contracted state to its most expanded state.

As described hereinabove, upon the shift-up the volume of the oil chamber 63 expands and oil is supplied through the communication hole 64 so that the oil damper 60 acts toward the compressive side with a resistance in proportion to the rate of expansion, thereby ensuring respective smooth engagements of the multiple disc clutches 31 and 51 to reduce any possible shocks induced by gear shifts.

When shifting up from the first speed to the fourth speed in particular, the oil damper 60 acts toward the compressive side under a large amount of variation in strokes, whereby it is possible to achieve respective smooth engagements of the front and rear multiple disc clutches 31 and 51 to effectively reduce the gear shift induced shocks.

Although the volume of the oil chamber 63 is subjected to substantially no change upon the gear shifting from the second speed to the third speed, the chamber 63 serves as a hydraulic piston restricting motions of the front and rear multiple disc clutches 31 and 51 together, thereby ensuring smooth clutch shifting actions and preventing any occurrence of gear shift judders as well as achieving reduced gear shift shocks.

Also, upon the shift-down, the oil damper 60 acts toward the expansile side so as to ensure that the multiple disc clutches 31 and 51 are smoothly disengaged to reduce any shocks or judders caused by gear shifts.

Upon the gear shift from the third speed to the second speed, smooth clutch shifting actions are achieved so that the gear shift judders are prevented from occurring with reduced gear shift shocks.

By virtue of the oil damper 60 constituted of the piston 62 and the cylinder 61 in cooperation and utilizing the space defined between the vertical annular walls 26a and 48a, which are axially movable members confronting each other, of the front and rear centrifugal clutches 30 and 50, respectively, it is possible to realize a simple structure without any need to individually provide the damper mechanisms on the centrifugal clutches 30 and 50 as well as to make the variable speed gearing system compact without needing any dedicated spaces.

Figure 6:
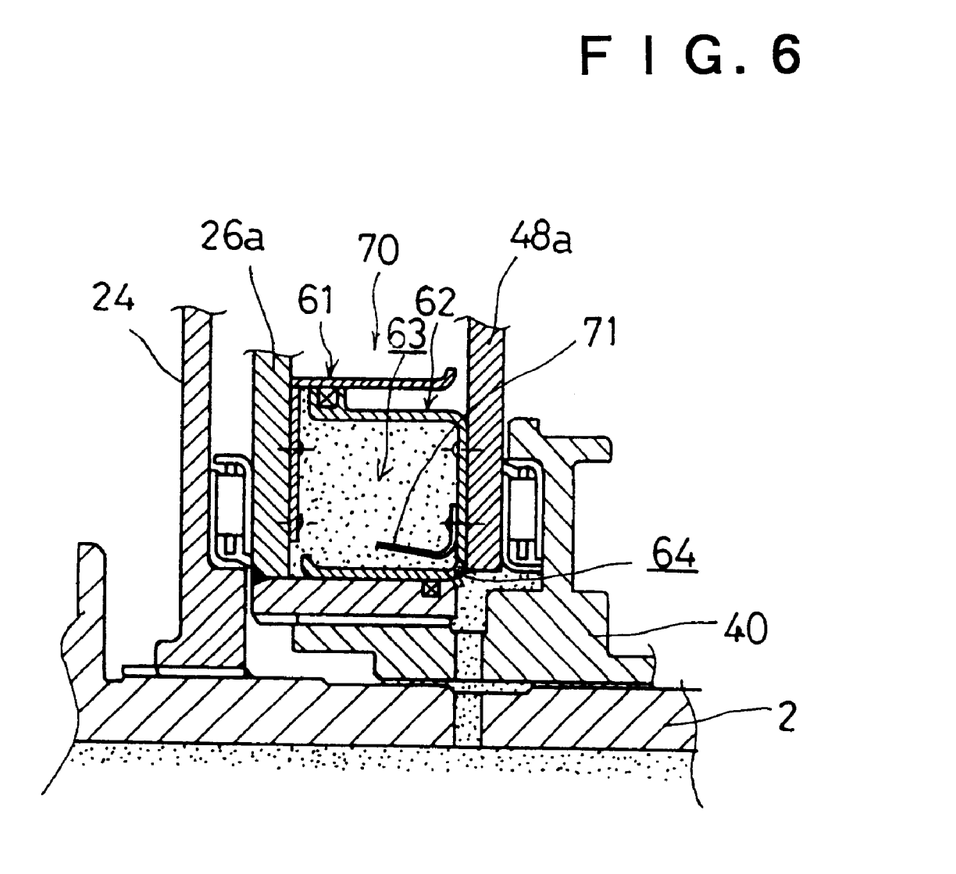
FIG. 6 is a sectional view of the oil damper having flow control means disposed in a communication passage leading into an oil chamber of the oil damper.
Figure 7:
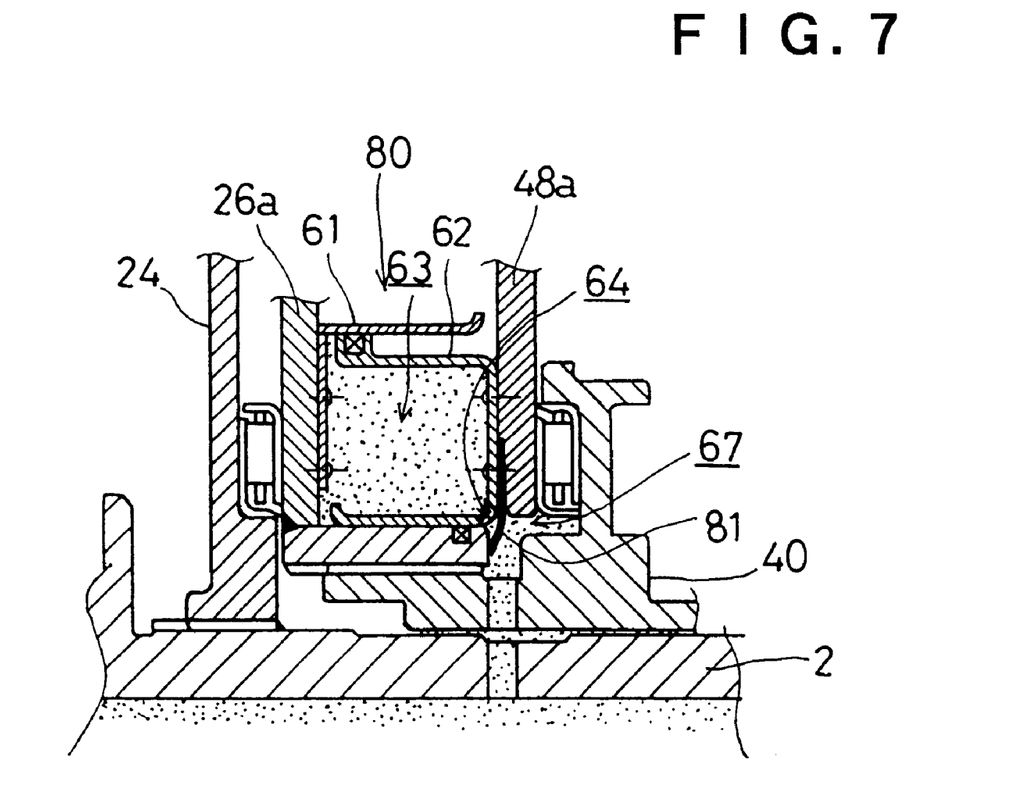
FIG. 7 is a sectional view of the oil damper having different flow control means disposed in the communication passage leading into the oil chamber of the oil damper.

Referring then to FIGS. 6 and 7 there are illustrated and described two further embodiments, respectively, in which the communication hole 64 of the oil damper 60 is provided with flow control means.

It is to be noted that the two embodiments have structurally substantially the same variable speed gearing systems and oil dampers and that the same members are designated by the same reference numerals.

An oil damper 70 shown in FIG. 6 comprises a substantially L-shaped resilient plate 71 bent on the piston 62 toward the oil chamber 63, the plate 71 having one portion fixedly secured thereto and the other portion directed to the communication hole 64.

Upon the shift-up giving rise to an expansion of the oil chamber 63 to allow oil to be fed thereinto, the same level of resistance as in the above embodiment is presented with the resilient plate 71 leaving the communication hole 64 open as shown in FIG. 6, whereas upon the shift-down causing a contraction of the oil chamber 63, the resilient plate 71 deforms in the direction closing the communication hole 64, resulting in an increased resistance against oil when it flows out of the oil chamber 63 through the communication hole 64.

This means that in cases where upon the shift-down a greater gear shift shock or judder is expected than in the shift-up, use of the inventive oil damper 70 ensures an effective reduction in shocks or judders induced by gear shifts.

An oil damper 80 shown in FIG. 7 comprises a resilient plate 81 protrusively provided in the space 67 outside the oil chamber 63 in such a manner as to confront the communication hole 64.

Upon the shift-up giving rise to an expansion of the oil chamber 63 to allow oil to be fed thereinto, the resilient plate 81 blocks the communication hole 64 as shown in FIG. 7 to provide a great resistance against the flow of oil, whereas upon the shift-down causing a contraction of the oil chamber 63, the resilient place 81 deforms in the direction opening the communication hole 63, providing little or substantially no resistance against the outflow of the oil.

This means that in cases where upon the shift-up a greater gear shift shock or judder is expected than in the shift-down, use of the inventive oil damper 80 ensures effectively reduced gear shift shocks or judders.

Figure 8:
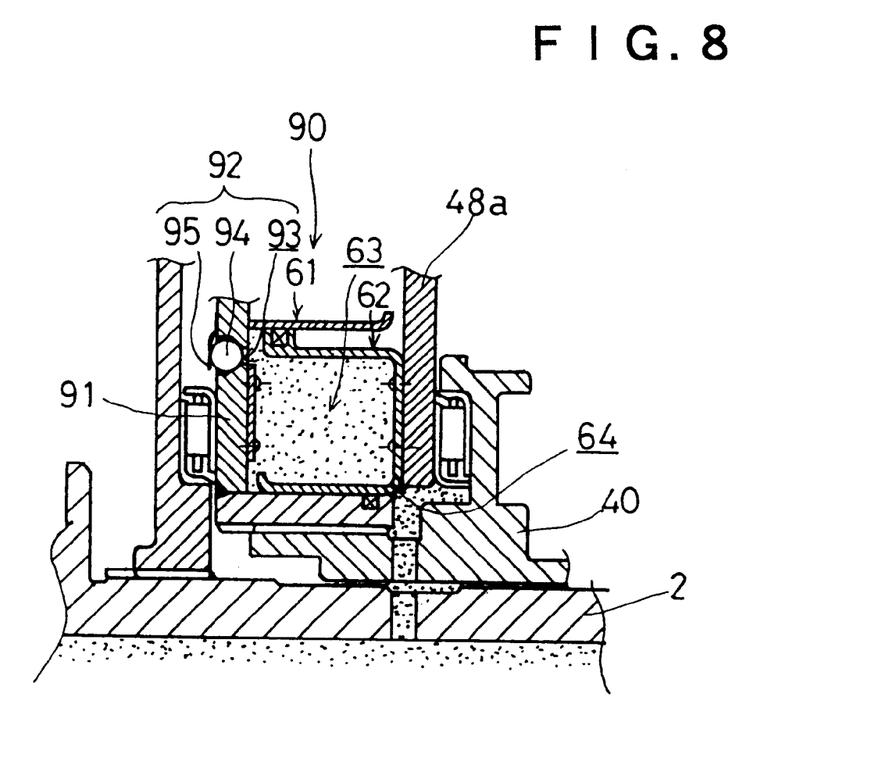
FIG. 8 is a sectional view of the oil damper provided with a one-way valve.

Referring then to FIG. 8 there is illustrated an embodiment of an oil damper 90 provided with a one-way valve 92.

Similarly to the above embodiments, the same members are designated by the same reference numerals.

The one-way valve 92 comprises a through-hole 93 formed in a vertical annular wall 91 of the front carrier for allowing the oil chamber 63 to communicate with the exterior, a ball 94 fitted externally into a greatly recessed outside opening of the through-hole 93, and a plate spring 95 for retaining the ball 94 externally.

In the event of no change in the volume of the oil chamber 63, the ball 94 retained by the plate spring 95 blocks the through-hole 93, and upon the expansion as well the ball 94 is in a sucked state closing the through-hole 93, whereas upon the shift-down causing a contraction of the volume of the oil chamber 63 a large hydraulic pressure is applied internally to the ball 94 to displace the latter against the spring force of the plate spring 95, with the result that the through-hole 93 is opened allowing the outflow of oil within the oil chamber 63.

Accordingly, upon the shift-down a less resistance is provided than in the shift-up, so that in cases where greater gear shift shocks or judders are expected in the shift-up rather than in the shift-down, use of the inventive oil damper 90 ensures an effective reduction of the shocks or judders induced by gear shifts.

It is also possible to eliminate any influence of a hydraulic pressure which may be generated by the centrifugal force within the oil damper 90.

Figure 9:
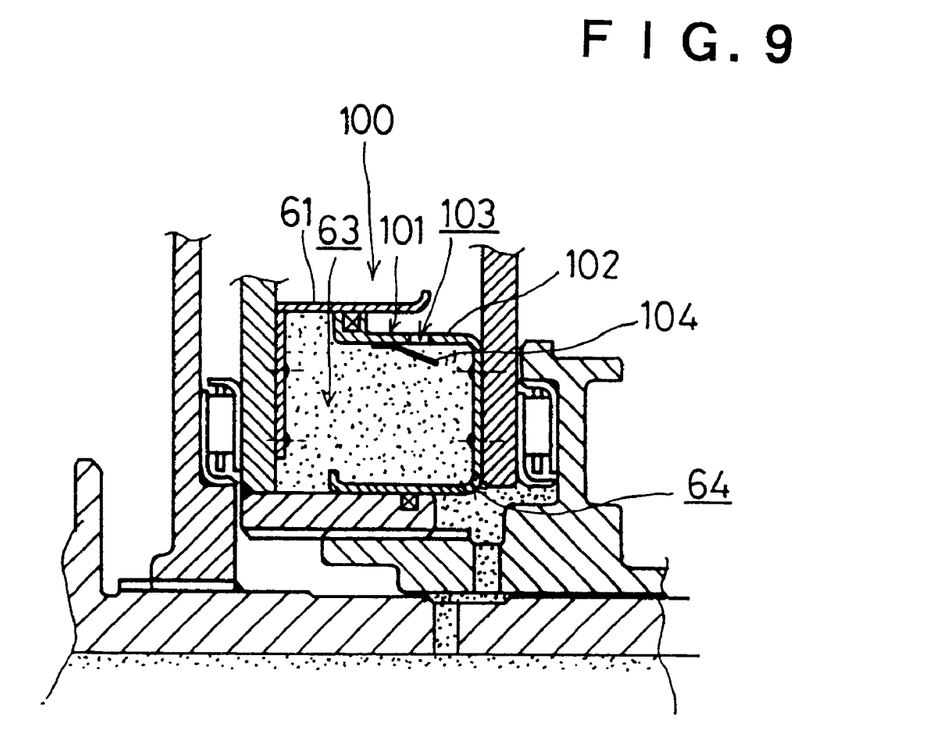
FIG. 9 is a sectional view of the oil damper provided with another one-way valve.

Reference is then made to FIG. 9 which illustrates an oil damper 100 in accordance with another embodiment.

The oil damper 100 has also substantially the same structure as the above embodiment, in which the same members are designated by the same reference numerals. The inventive oil damper 100 comprises a piston 101 of a U-shaped section having an outer tubular portion 102, a through-hole 103 formed in the outer tubular portion 102 for allowing a communication between the oil chamber 63 and the exterior, and a resilient plate 104 provided inside of the outer tubular portion 102 for freely opening and closing the through-hole 103.

In the event of no change in the volume of the oil chamber 63, the resilient plate 104 closes the through-hole 103 under the hydraulic pressure within the oil chamber 63, and upon the contraction as well the through-hole 103 is closed by the resilient plate 104 due to the action of the hydraulic pressure within the oil chamber 63, whereas upon the shift-down causing an expansion of the volume of the oil chamber 63, the hydraulic pressure within the oil chamber 63 is reduced so that the resilient plate 104 deforms as shown in FIG. 9 to open the through-hole 103, allowing oil within the oil chamber 63 to flow out.

Accordingly, upon the shift-up a less resistance is provided than in the shift-down, so that in cases where greater gear shift shocks or judders are expected in the shift-down rather than in the shift-up, use of the inventive oil damper 100 ensures effectively reduced gear shift shocks or judders.

An appropriate weight may fixedly be secured to a site where the resilient plate 104 swings in order to control the timing to open the through-hole 103.

It is also possible to eliminate any influence of a hydraulic pressure which may be generated by the centrifugal force within the oil damper 100.

Figure 10:
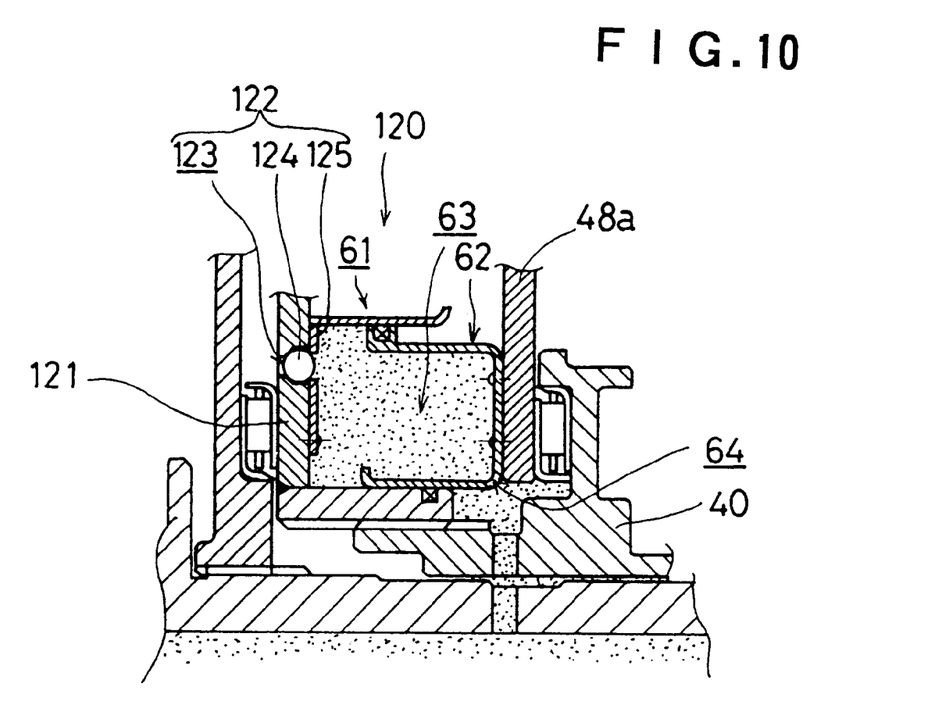
FIG. 10 is a sectional view of the oil damper provided with a further one-way valve.

Reference is then made to FIG. 10 which illustrates an oil damper 120 in accordance with a further embodiment.

The oil damper 120 has also substantially the same structure as the above embodiments, in which the same members are designated by the same reference numerals.

It resembles in particular the oil damper 90 shown in FIG. 8, but differs therefrom in that a one-way valve of this embodiment has the opposite releasing direction.

More specifically, the one way valve designated at 122 comprises a through-hole 123 formed in a vertical annular wall 121 of the clutch guide on the front carrier, for allowing a communication between the oil chamber 63 and the exterior, a ball 124 fitted internally into a greatly recessed inside opening of the through-hole 123, and a plate 125 disposed on the inside and having an opening edge for preventing any possible disengagement of the ball 122.

Upon the expansion of the oil chamber 63 the peripheral oil is sucked through the one-way valve 122, whereas upon the compression the through-hole 123 is closed. As a result of this, upon the shift-up a less resistance is provided than in the shift-down, so that in case greater gear shift shocks or judders are expected upon the shift-down, use of the inventive damper 120 ensures an effective reduction in shocks or judders induced by gear shifts.

INDUSTRIAL APPLICABILITY

The present invention can be applied to a variable speed gearing system for reducing gear shift shocks or gear shift judders.

What is claimed is:

1. A variable speed gearing system including two clutch units placed side by side in the axial direction, said variable speed gearing system providing a plurality of transmission gear ratios in response to the state of engagement of clutches of said two clutch units, said two clutch units being provided with axially movable members confronting each other;

said variable speed gearing system comprising:

a piston member provided on one of said axially movable members confronting each other; and a cylinder member provided on the other of said axially movable members confronting each other, said piston member and said cylinder member constituting a damper mechanism in combination with each other.

2. The variable speed gearing system according to claim 1, further comprising:

an oil chamber defined by said piston member and said cylinder member in cooperation, said oil chamber having an expanded or contracted volume; and communication passages extending from oil passages formed within shafts for axially movably supporting said movable members of said clutch units, into said oil chamber.

3. The variable speed gearing system according to claim 2, further comprising flow control means disposed in said communication passages for imparting different passage areas to said communication passages between expansion and contraction of said oil chamber.

* * * * *